April 16, 1940.  F. P. MANSBENDEL  2,197,381

WEIGHT TESTING MACHINE

Filed Sept. 22, 1936  6 Sheets-Sheet 1

INVENTOR
Fritz P. Mansbendel
BY
James R. Franklin
ATTORNEYS

April 16, 1940.　　　F. P. MANSBENDEL　　　2,197,381
WEIGHT TESTING MACHINE
Filed Sept. 22, 1936　　　6 Sheets-Sheet 3

INVENTOR
Fritz P. Mansbendel
BY
ATTORNEYS

April 16, 1940. F. P. MANSBENDEL 2,197,381
WEIGHT TESTING MACHINE
Filed Sept. 22, 1936 6 Sheets-Sheet 4

INVENTOR
Fritz P. Mansbendel
BY
ATTORNEYS

April 16, 1940.  F. P. MANSBENDEL  2,197,381
WEIGHT TESTING MACHINE
Filed Sept. 22, 1936  6 Sheets-Sheet 6

INVENTOR
Fritz P. Mansbendel
BY
ATTORNEYS

Patented Apr. 16, 1940

2,197,381

UNITED STATES PATENT OFFICE 2,197,381

WEIGHT TESTING MACHINE

Fritz P. Mansbendel, Brooklyn, N. Y., assignor to The Fred Goat Co., Inc., Brooklyn, N. Y., a corporation of New York Application September 22, 1936, Serial No. 101,925

19 Claims. (Cl. 209—121)

This invention relates to weight testing machines, and more particularly to automatically operated apparatus for rapidly checking or testing the weight of packaged food or the like.

The primary object of my invention is to generally improve weight testing machines. A more particular object is to devise such a machine in which the weighing apparatus may be made highly sensitive while establishing a cycle of operation which is predetermined and uniform regardless of the amount of error or unbalance produced by successive packages fed to the machine. The scale may itself be a sensitive precision instrument, and is equipped with tolerance determining mechanism which establishes any desired tolerance within which an error in package weight is incapable of unbalancing the scale. On the other hand, when the error in package weight exceeds the tolerance, the rate of descent or tipping of the scale is accurately predetermined and controlled, and is limited to a desired speed regardless of how heavily the scale is unbalanced.

In accordance with a further feature and object of my invention, this controlled rate of descent is itself uniformly accelerated in accordance with the natural rate of descent of the scale mechanism and packages which would be produced by the smallest practical tipping force or unbalance in excess of tolerance. This arrangement not only minimizes wear on the scale bearings, but ensures dependable response where, as is preferably the case, the position of the scale (whether in equilibrium or tipped) is tested at the termination of the weighing cycle, for the present invention prevents bouncing or swinging of the scale such as might be produced by a large unbalance. The arrangement is superior to the use of a dashpot or like damping device because it in no way impairs the sensitivity of the scale and in no way slows the scale from its fastest possible operating cycle when the amount of unbalance in excess of tolerance is a minimum. In fact, the operation can hardly be compared to an ordinary weighing operation, for there is merely a discrimination between packages within and without the tolerance limits, the scale remaining in perfect equilibrium for amounts of unbalance within the tolerance limit, and the scale tipping at a controlled rate when the unbalance exceeds the tolerance whether the excess be minute or enormous.

In accordance with another object of my invention, the descent or tipping of the scale is controlled by appropriate pan supports preferably disposed directly beneath each of the scale pans, and these supports are normally elevated by resilient means to a point where the scale pans are just relieved from their knife-edge bearings, thereby fixedly supporting the scale pans in equilibrium position during the feed of a package to the scale and during discharge of the package from the scale, the scale pans being rested on their sensitive jeweled bearings solely during the weighing operation itself. A further and more detailed feature of the invention resides in the provision of mechanical means for substantially elevating the scale pans and the scale beam from all of their respective knife-edge bearings when the machine is not in use or is undergoing shipment.

Further objects of my invention are to make the correct weight or the average weight to be tested readily changeable, and further, to make the amount of tolerance permitted by the machine readily changeable. Another object is to greatly simplify and increase the accuracy and dependability of the tolerance determining mechanism.

Still further objects of my invention center about the means for testing or determining whether the scale is in equilibrium or has been unbalanced. The condition of the scale is preferably tested by electrical means including a contact switch mechanically moved with relation to the scale at the end of each weighing operation. To control a contact directly by the scale is entirely unsatisfactory because the quality of the contact obtained will depend on the amount of unbalance of the scale. Moreover, such mechanism interferes with the sensitivity of the scale. In accordance with my invention, I provide an abutment which is moved without friction by unbalance of the scale. The contact switch is itself mechanically positively moved by the power driven mechanism of the machine, and is arranged to clear the abutment when the scale is in equilibrium but to bear sidewardly against the abutment when the scale is tipped. The load on the abutment in reaction to the contact switch is not only applied sidewardly relative to the scale, thereby in no way affecting the operation of the scale, but this load may be and preferably is taken by means other than the scale, said means being mounted directly on the machine frame. In accordance with another feature of the invention, the operation of the aforesaid contact need only be momentary, it being used to control a suitable stick relay which in turn controls relatively heavy solenoid mechanism, the operation of which may be sustained for a substantial part of the operating cycle of the machine. This solenoid may itself be employed to control the operation of appropriate discard mechanism determining the direction of discharge of the tested package from the scale.

The operation of the machine is preferably speeded by employing two scales which are operated in alternation, and further objects of my invention center about the mechanism for transferring packages from the supply track to either scale and from the scales to delivery tracks or discard chutes. These mechanisms are kept well spaced from the scales and the packages thereon during the weighing operation itself in order to in no way interfere with the desired accurate and sensitive operation of the scales.

To the accomplishment of the foregoing and other objects which will hereinafter appear, my invention consists in the weight testing machine elements and their relation one to the other, as hereinafter are more particularly described in the specification and sought to be defined in the claims. The specification is accompanied by drawings, in which:

Referring to the drawings, the weight testing machine here disclosed comprises a supply track T along which a series of packages to be tested are moved, and a pair of weight testing scales S, one on each side of the end of supply track T. Appropriate feed or distributor mechanism F functions to transfer alternate packages to each of the scales S. During the feed of packages to the scale and, in fact, at all times except for the weighing operation itself, each scale is held locked and is relieved from its knife-edge bearings by appropriate scale supports D which descend during the weighing operation. The rate of descent of the scale supports is so chosen as to be less than the natural rate of descent of the heavier loaded scale pan, when the unbalancing force is a practical minimum.

The scale is made accurate and sensitive but is prevented from tipping by any slight force or unbalance less than a desired predetermined amount, this being the permissible variation or tolerance in the weight of the finished packages. The tolerance is determined by suitable mechanism, generally designated M. The tolerance is fixed by a readily accessible and easily changeable tolerance weight W in the form of an elongated rod. The condition of the scale at the end of the weighing operation, that is, whether the scale has remained in equilibrium or has tipped, is discovered or tested by suitable scale contact mechanism C. The force needed to operate the scale contact or switch is derived from the driving shaft of the machine, and in no way depends upon the force tipping the scale. Moreover, the force needed to operate the contact mechanism reacts upon stationary parts of the machine frame and does not disturb the condition of the scale.

Figure 7:
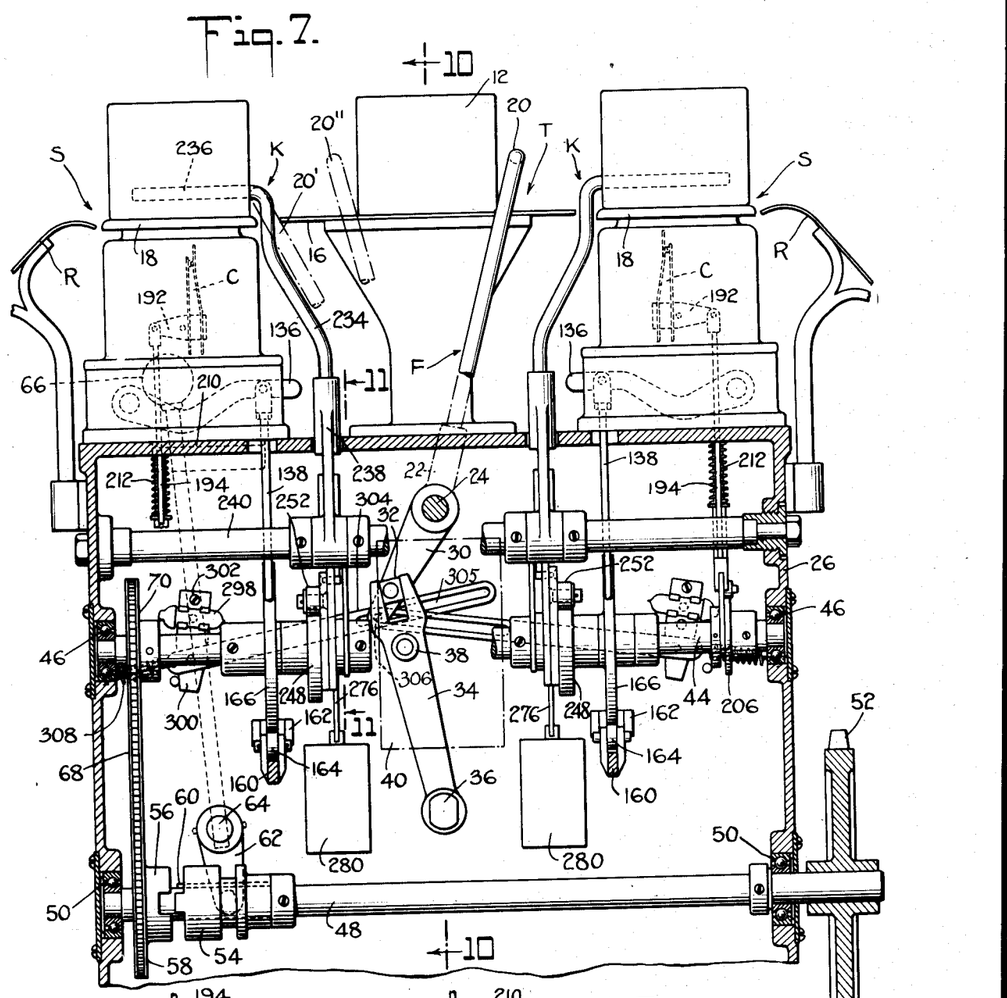
Fig. 7 is a section taken in elevation in the plane of the line 7—7 of Fig. 1, and shows the driving mechanism in the base of the machine.

After the weight of the package has been tested, the package is discharged from the scale. If the package is of correct weight, it is fed from the scale in the same direction as the initial direction of supply, the package being discharged or kicked off the scale by mechanism generally designated K. This mechanism is driven by a cam arrangement best shown in Fig. 11, and normally functions during each cycle of the machine. However, the cam driven mechanism includes an appropriate latch or trigger making the same inoperative to kick the package off the scale whenever the package is of incorrect weight, that is, when the scale has been tipped as determined by the scale contact C previously referred to. In such case the package remains on the scale until the next package to be weighed is transferred sidewardly from the supply track T by the feed mechanism F. The new package displaces the faulty package sidewardly, and the latter is moved onto a discard or reject chute R which is preferably steeply inclined, as indicated in Fig. 7, so that the rejected package continues its travel gravitationally. The rejected packages are thus segregated from the accepted packages.

The various parts and mechanism referred to above are next described in greater detail.

Feed mechanism

Figure 1:
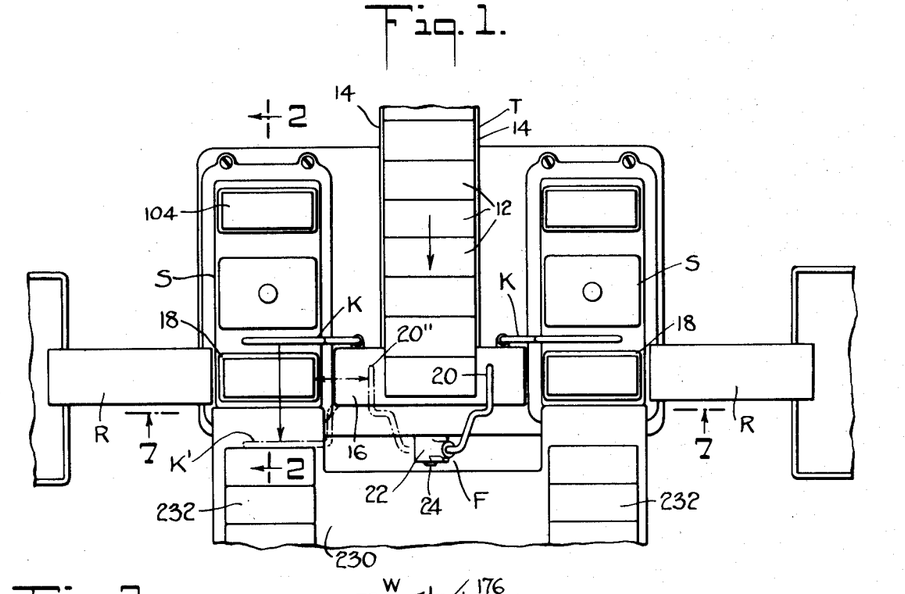
Fig. 1 is a plan view of the weight testing machine showing the general arrangement thereof.
Figures 10, 11, 12:
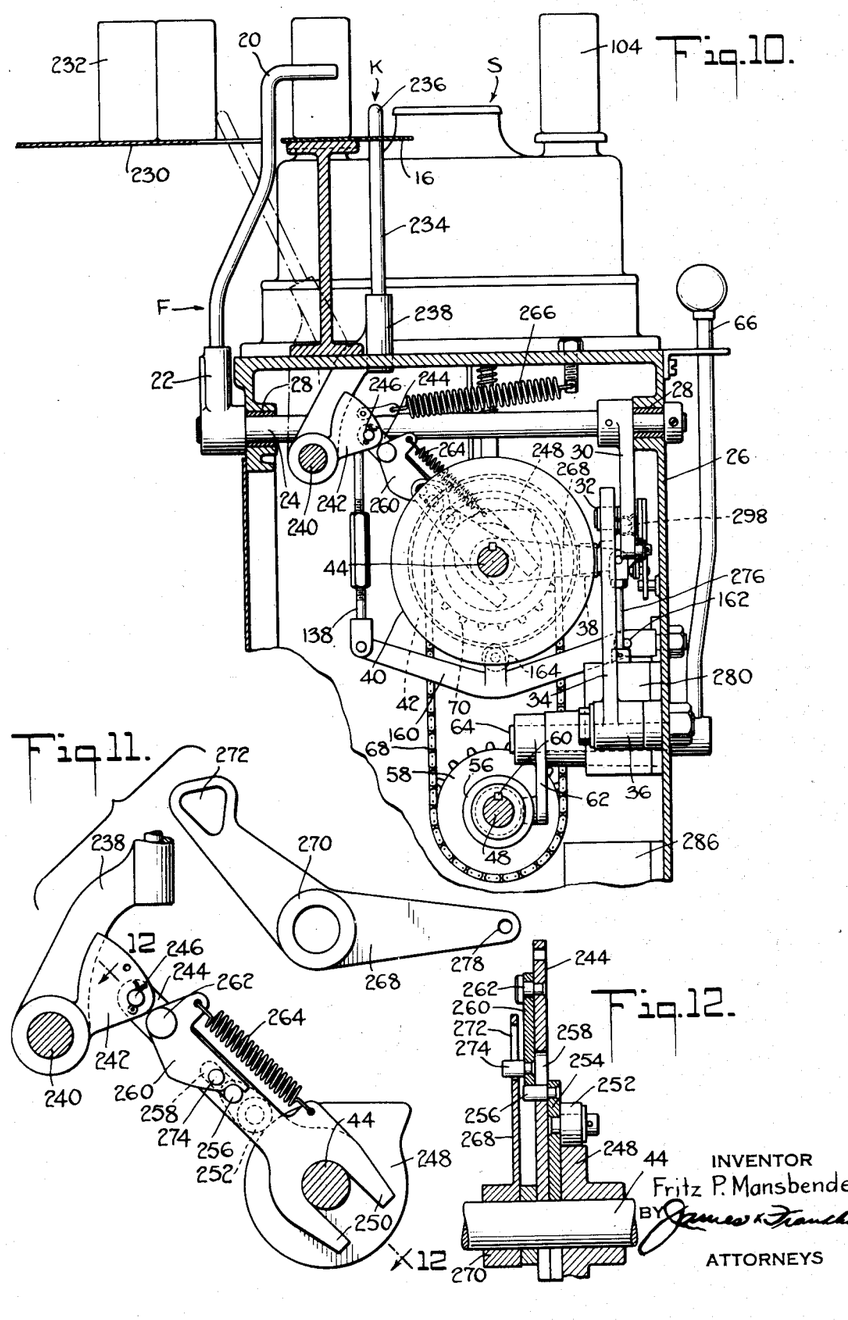
Fig. 10 is a section through the operating mechanism taken in the plane of the line 10—10 of Fig. 7.
Fig. 11 shows the mechanism for controlling the operation of the package discharge arm, and is taken in the plane of the line 11—11 of Fig. 7.
Fig. 12 is a section taken in the plane of the line 12—12 of Fig. 11.

Referring to Figs. 1, 7, and 10 of the drawings, the packages 12 are moved intermittently by an amount equal to the dimension of the package in the direction of the track. This preferably takes place automatically by reason of the fact that the track T leads directly from the filling and packaging machine, and the discharge of packages from that machine itself constitutes the feed of packages to the present weight testing machine. The track T may, of course, be flanged at 14 to guide the packages in alignment. The end of the track is provided with a transverse path or plate 16, and flanges 14 terminate short of the plate 16. Plate 16 is disposed in alignment with and extends between scale pans 18 of the scales S. A distributor arm or feed arm 20 is oscillatable over plate 16. Arm 20 is secured to an appropriate collar 22 mounted on the end of a transverse oscillatable shaft 24, as is best shown in Fig. 10. Shaft 24 is journaled in the machine frame 26 at bearings 28. The opposite end of shaft 24 carries a depending arm 30 the lower end of which is provided with an oscillatable bearing block 32 (Fig. 7) which rides in the slotted upper end of a cam follower arm 34 stationarily pivoted on the machine frame at 36. Cam follower arm 34 carries a revoluble cam follower 38 which is received in the groove of a cylindrical or barrel cam 40, best shown in Fig. 10 and schematically indicated by dot and dash lines in Fig. 7. It will be understood that the cam groove 42 in the cylindrical face of cam 40 causes cam follower 38 to move from side to side, that is, axially of the cam, and this in turn causes oscillation of arm 34 with attendant oscillation of arm 30, which in turn oscillates shaft 24 and feed arm 20.

Figure 17:
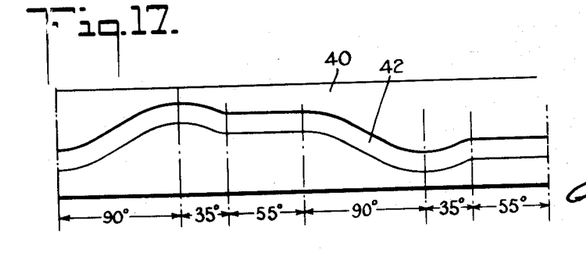
Fig. 17 is a development of a cam track used in the machine.

Referring now to Figs. 1 and 7, the feed arm 20 normally dwells in a position between track T and the scale pans 18, as is clearly shown by the solid-line position of the feed arm. As indicated in Figs. 1 and 7, the next package to be tested is to be fed to the left-hand scale, and the feed arm 20 is moved from the solid-line position in a counter-clockwise direction to the broken-line position 20', at which time the package to be tested is deposited symmetrically on scale pan 18. The feed arm 20 is thereupon retracted part way toward center and dwells in the broken-line position 20'' between the left hand scale and track T. It will be understood that the next package is fed to the right-hand scale and at this time the arm is moved from the broken-line position 20'' in a counter-clockwise direction until the package is deposited symmetrically on the right-hand scale, whereupon the arm is immediately retracted to the intermediate or dwell position shown in solid lines, thereby completing the cycle of operation of the feed arm. The reason the arm is immediately retracted from the scale is in order not to interfere with accurate weighing of the package, for otherwise accurate measurement would be affected by the frictional engagement between the feed arm and the package. The arm is, of course, retracted only partially, first, in order not to interfere with the continued supply of packages along track T, and secondly, in order to hold the arm in readiness for the next package distributing or transfer movement. The nature of the cylindrical cam 40 will be clear from the above description, and from the development of a suitable cam track shown in Fig. 17. In this development the sweep of the arm takes place in 90° rotation and the retraction in 35° rotation, whereupon the arm dwells for 55° rotation. The corresponding movements for the opposite scale require the other half revolution of the cam.

Cylindrical cam 40 is mounted on a main timing shaft 44 extending across the base or frame 26 of the machine, the ends of the timing shaft being mounted in suitable bearings 46, as is best shown in Fig. 7. In Fig. 7 the central part of shaft 44 and the cylindrical cam have been cut away in order to better show the interconnection of arms 34 and 30 as well as other parts of the machine. Timing shaft 44 is driven by a driving shaft 48 extending parallel to but lower than timing shaft 44. Shaft 48 is journaled in frame 26 by bearings 50, and carries a sprocket wheel 52 or like device for connection to a source of power. In practice, the sprocket wheel 52 is preferably chained to the timing shaft or other appropriate part of the packaging machine which forms the packages undergoing test, so that the packaging machine and the weight testing machine operate in perfect synchronism. In fact, the main reason the present machine is arranged in duplex, that is, with two scales which are alternately operated, is in order to speed up the capacity of the present machine to an amount equal to or exceeding the maximum operating speed of the packaging machine while at the same time allowing adequate time for careful weighing operation.

The driving shaft 48 carries the driving half 54 of a clutch the driven half 56 of which is formed integrally with a sprocket wheel 58. Clutch member 54 is keyed to shaft 48 at 60 but is axially movable by means of a clutch lever 62 connected through a pin 64 to a manually oscillatable control lever 66. In Fig. 7 the clutch is shown in disengaged position, but by swinging the handle 66 clockwise, the parts of the clutch are engaged, and timing shaft 44 is thereupon driven in unison with driving shaft 48, the sprocket wheel 58 driving chain 68 which in turn meshes with a sprocket wheel 70 on the timing shaft. It will be understood that if the clutch may be dispensed with, the externally driven sprocket wheel 52 may, if desired, be mounted directly on one end of the timing shaft 44.

*Scale locking mechanism*

Figure 2:
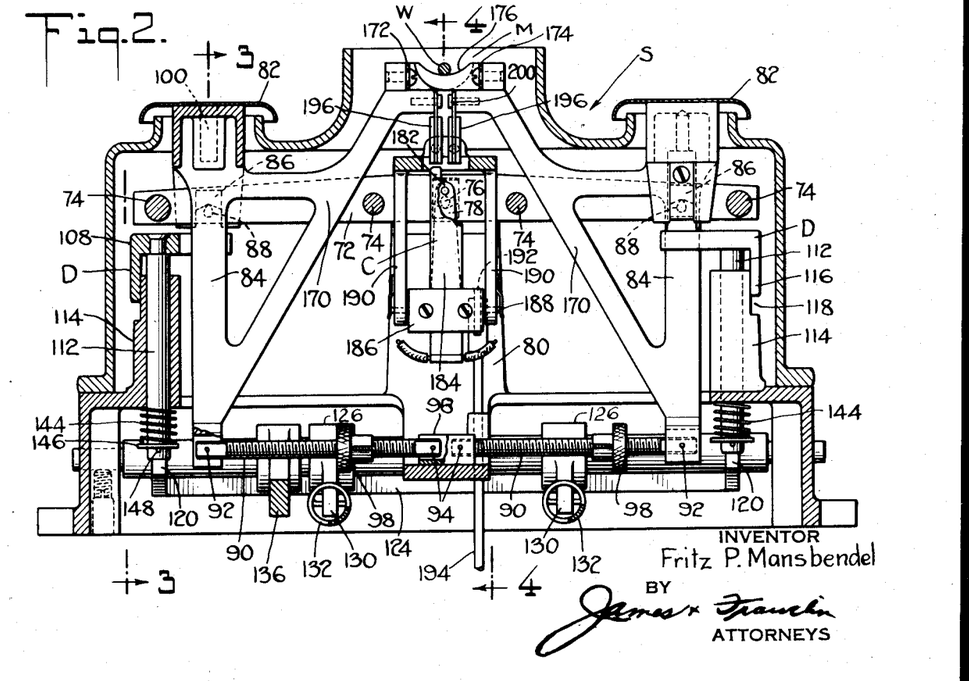
Fig. 2 is an enlarged section taken in elevation through one of the scales, this section being taken in the plane of the line 2—2 of Fig. 1.
Figure 3:
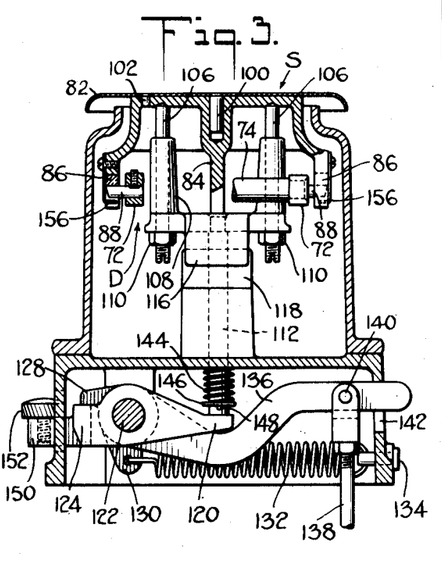
Fig. 3 is a transverse section through one of the scale pans taken in the plane of the line 3—3 of Fig. 2.
Figure 4:
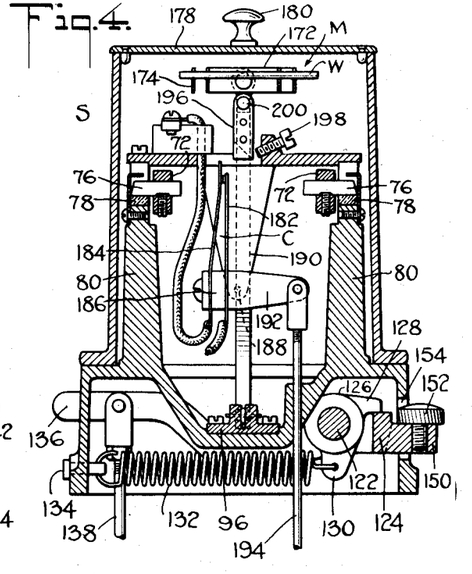
Fig. 4 is a transverse section through the center of the scale taken in the plane of the line 4—4 of Fig. 2.

The nature of the weighing scales is best shown in Figs. 2 through 6, referring to which it will be seen that each scale comprises a scale beam including spaced parallel arms 72 connected by transverse rods 74. The scale beam is oscillatably supported by knife edges 76 projecting outwardly from members 72, as is best shown in Fig. 4, and resting upon suitable notched jewels or stones 78, the latter being secured to a stationary scale frame or casting 80.

Sheet metal scale pans 82 are mounted on top of vertically movable members 84 which in turn rest on the ends of the scale beam through appropriate knife-edge bearings. More specifically, members 84 carry appropriately notched jewels or stones 86 (Fig. 3) which overlie upwardly directed knife edges 88 secured to and projecting outwardly from the members 72 of the scale beam. Vertically disposed members 84 are maintained in vertical position during operation of the scale, by appropriate linkage for parallel motion. More specifically, I provide links 90 (Figs. 2 and 5) the outer ends of which are pinned to the lower ends of members 84 by appropriate small-diameter and relatively frictionless pins 92, and the inner ends of which are similarly pinned at 94 to a bearing block 96 secured to the center of the scale frame. The pins 94 are sufficiently close together to introduce no appreciable error in the desired parallel motion of the scale pans. The links 90 are preferably threaded and provided with split knurled adjusting nuts 98 which may be screwed along the links in one direction or the other to bring the scales into perfect balance.

Figure 6:
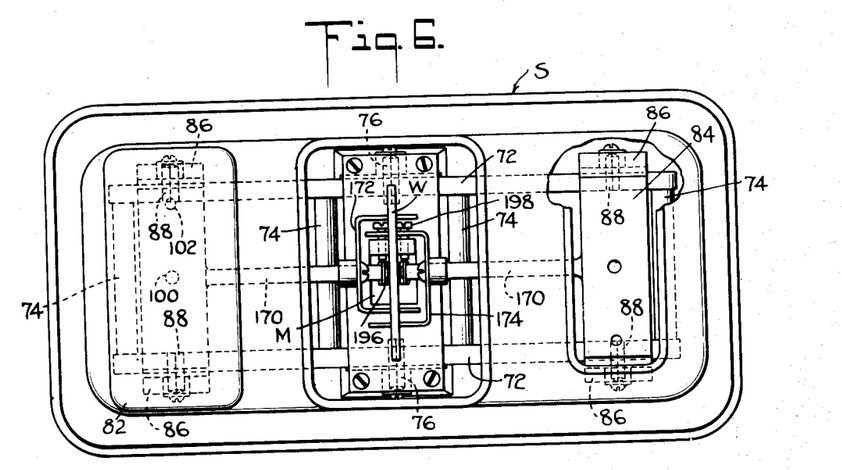
Fig. 6 is a plan view of the scale with the cover plate over the tolerance mechanism removed.

Pans 82 are removably applied to members 84, as by the use of a main center pin 100 and one or more auxiliary locating pins 102 riveted to the pan (see Fig. 3). The pans may thus be changed to suit the nature of the work being handled. Of course, one end only of the scale is used for the packages being tested, while a fixed weight is placed on the other end of the scale. As illustrated in Fig. 1, this fixed weight may, if desired, be a sample package of correct weight, the said package being marked 104. However, a lumped metallic weight of desired mass may be used in lieu of a sample package, and the scale pan at that end of the scale may, if desired, be appropriately changed to receive and even to lock such a lumped mass in position. In Fig. 6 the right-hand pan has been removed.

The scale is locked during the feed thereto and discharge therefrom of a package being tested. This is obviously desirable in order to fix the position of the scale pan in alignment with the plate 16 along which the package is being slid by the distributor arm 20. It is also desirable for reasons which will hereinafter appear, centering about controlled rate of movement of the scale. In accordance with the present invention, the scale is not only locked but is relieved from its knife-edge bearings, thereby minimizing wear on the same. In fact the scale is unlocked and the knife-edge bearings are employed, solely during the weighing operation itself.

Figure 5:
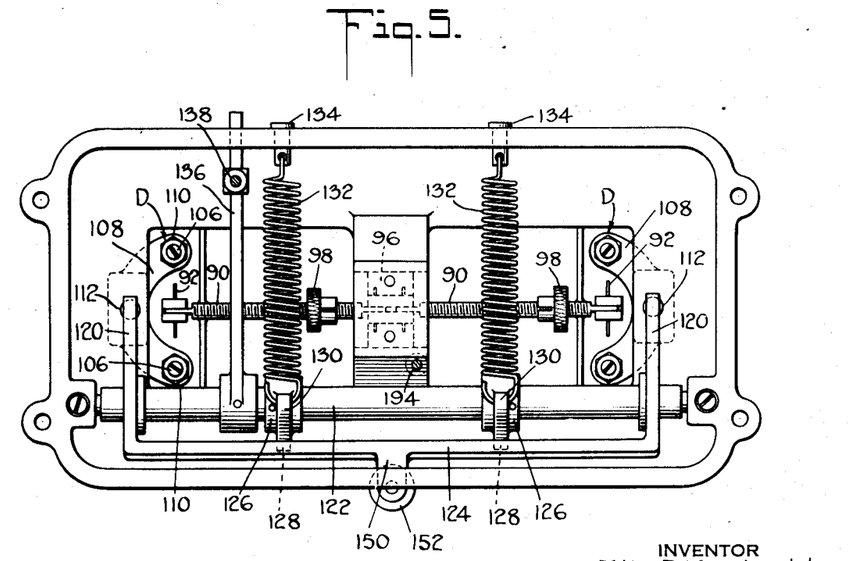
Fig. 5 is an inverted plan view of the scale.

To this end, I provide scale pan supports 106 (Fig. 3) threadedly adjustable in a vertically reciprocable yoke 108. The adjustment of pins 106 may be locked by nuts 110. Yoke 108 is carried at the upper end of a vertically reciprocable rod 112 (Fig. 2) received in a bearing 114 forming a part of the scale frame. Yoke 108 includes a depending flange 116 which slides along a mating surface 118, thereby holding the yoke and rod 112 against oscillation within bearing 114. The lower end of rod 112 rests on an arm 120 (Figs. 3 and 5) secured to a shaft 122 extending longitudinally of and beneath the scale. As is best shown in Figs. 2 and 5, the arm 120 forms one end of a broad U-shaped member, the opposite end of which is a similar arm similarly related to the opposite end of the scale. Arms 120 are connected by a rail 124 extending generally parallel to shaft 122. Shaft 122 carries a pair of small sturdy angle levers 126 the horizontal arms 128 of which extend outwardly and overlie rail 124 (see Figs. 3 and 4) and the vertically depending arms 130 of which are pulled in counter-clockwise direction, as viewed in Fig. 3, by relatively powerful pull springs 132 the opposite ends of which are connected to the scale frame at 134 (see Figs. 3, 4, and 5).

Shaft 122 also carries an operating and motion limiting lever 136. A vertically movable pull rod 138 is pivoted to lever 136 at 140. The end of the lever projects through a slot 142 in the scale frame, thereby limiting the upward movement of lever 136, which in turn limits the oscillation of shaft 122 produced by springs 132. This establishes the normal elevated position of the scale pan support pins 106, and that position is so selected and adjusted as to just relieve the scale pans from the knife-edge bearings without appreciably physically elevating the scale pans above their equilibrium position. When pull rod 138 is drawn downwardly by mechanism subsequently described, lever 136 and shaft 122 are oscillated in a clockwise direction, as viewed in Fig. 3. The scale supports thereupon descend not only gravitationally but also through the assistance of relatively light compression springs 144 surrounding the lower ends of rods 112 and bearing against thrust washers 146 pinned at 148.

It is unnecessary for the arms 120 to be pinned to shaft 122 and it is preferred not to do so in order to make it possible to elevate the scale pan supports by an especially large amount during non-use or shipment of the machine. Specifically, the rail 124, which interconnects the arms 120, is provided with an outwardly projecting lug 150 carrying a knurled thumb screw 152 (see Figs. 3, 4, and 5). The lug 150 passes through a slot or passage 154 in the side wall of the scale frame, and when the screw 152 is turned downwardly, as shown in the drawings, the passage 154 provides ample clearance for the movement of the scale supports or locking mechanism. When, however, screw 152 is turned upwardly, it bears against the top of the opening 154 and forces the lug 150 downwardly, thereby moving the arms 120 upwardly, which in turn elevate the scale pan supports, and the resulting movement may be made substantially greater than that used during operation of the machine. The scale pans are thus carried upwardly from the knife edges 88 (see Fig. 3), and, by reason of inwardly flanged plates 156, which plates underlie the backs of the knife-edge bearings 88, the continued upward movement of the scale pans not only lifts the jewels 86 from the knife edges 88 but thereafter carries the scale beam 72 upwardly and so lifts the knife-edge bearings 76 (see Fig. 4) from stones 78. The scale is then locked against injury, as is particularly desirable during shipment of the machine.

Figure 13:
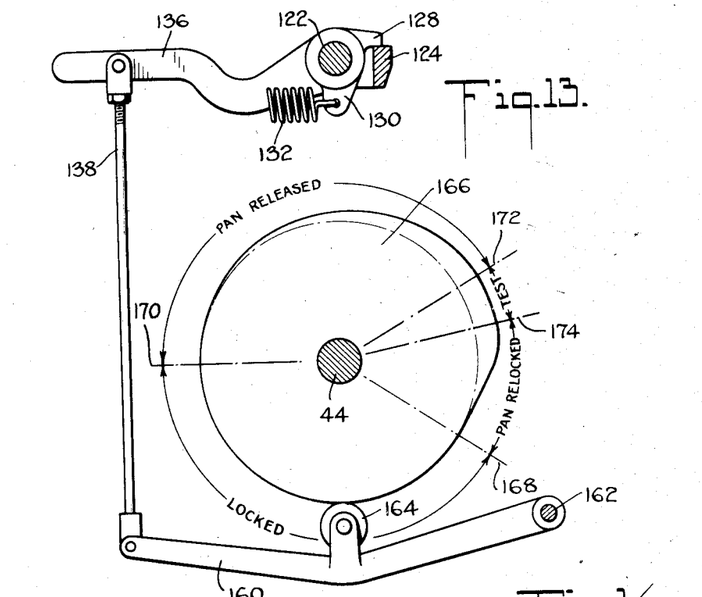
Fig. 13 illustrates the cam control mechanism for determining the rate of descent of a scale pan when unbalanced.

I have already referred to pull rod 138 which lowers the scale lock during the weighing operation. Referring now to Fig. 13, it will be seen that rod 138 extends from operating lever 136 to a cam follower lever 160 the opposite end of which is carried in a stationary bearing 162 mounted on the machine frame. Lever 160 carries a cam follower roll 164 which rides at the bottom of a suitable cam 166 mounted on the timing shaft 44 previously referred to. It will be noted that the cam is characterized by small uniform radius from the point 168 to the point 170, and at this time the scale lock is elevated and the scale is fixed against movement. During the first part of this locked interval, the package previously tested is discharged from the locked scale pan, and thereafter the package next to be tested is fed to the locked scale pan. From the point 170 to the point 172, the cam radius increases, thereby causing gradual lowering of the scale pan support, and this in turn permits the scale to tilt if it is unbalanced by an amount exceeding the tolerance.

The shape of cam 166, particularly the region between the points 170 and 172, I consider to be one of the most important features of the invention, for the scale pan supports are lowered at a rate no faster than the natural rate of descent of the heavier loaded scale pan when unbalanced by a minimum practical amount in excess of the tolerance. The mass being moved is the mass of the moving parts of the scale and the weights thereon. The force causing movement is a constant amount, and the natural rate of descent of the heavier scale pan is therefore uniformly accelerated under the influence of gravity. The curvature followed by cam 166 between points 170 and 172 is therefore preferably an acceleration curve. Of course, in actual operation the unbalancing force is almost always greater than the force for which cam 166 is theoretically computed. The heavier loaded scale pan therefore rests upon the support pins 106 at all times during descent of the scale pan, and the resulting movement is smooth and takes place at a predetermined speed which insures proper uniform cyclic operation of the machine, particularly with respect to a movable electrical contact device associated with the scale, as will be subsequently described. If the scale lock were suddenly released, the rate of tipping of the scale would depend on the amount of unbalance of the particular package being tested, and the scale would tend to hit and bounce when reaching the lower limit of movement. This would cause excessive wear on the knife-edge bearings, and, even more importantly, would make the operation of the machine undependable, for bouncing or swinging of the scale might cause the same to appear to be in equilibrium at the moment the automatic test is made to see whether the scale has remained in equilibrium or has been tipped.

Referring again to Fig. 13, the cam 166 is of uniform but large radius between the points 172 and 174, and it is during this period that the aforesaid test is made to see whether or not the scale has tipped. Between the points 174 and 168 the cam decreases in radius and the scale pan supports rise and again lock the scale preparatory to changing the package thereon.

Referring now to Fig. 7, it will be noted that a rod 138 depends from the operating lever 136 of each of the scales S. Two cams 166 are provided on timing shaft 44, one of the cams being beneath each of the scales. Rods 138 are broken away to show cam follower rolls 164 mounted on cam follower levers 160. The arrangement of the parts will be manifest by simultaneous consideration of Figs. 7 and 13.

Tolerance determining mechanism

It has already been mentioned that the scale, while sensitive enough in construction to be tipped by a very slight unbalance, is provided with special mechanism to prevent the same from tipping unless the unbalance exceeds a predetermined permissible tolerance in package weight. This mechanism may operate on the principle of applying an upward force to whichever scale pan attempts to descend, but I find it more convenient to apply a downward force to whichever scale pan attempts to rise, for in the latter case the force may be obtained in a direct and simple manner from a tolerance weight equal to the desired tolerance. More specifically, I load a tolerance weight simultaneously on both scale pans, and arrange the same so that either scale pan may alone support the weight. That scale pan which attempts to rise is instantly loaded with the tolerance weight, and the scale is therefore not tipped unless the unbalancing force exceeds the tolerance weight.

Referring to Figs. 2, 4, and 6 of the drawings, the vertically disposed members 84 are provided with extensions 170 directed from each member 84 or its scale pan toward the opposite end of the scale. One extension carries a U-shaped support 172 (Fig. 6) and the other carries a U-shaped support 174. These supports are displaced sidewardly relative to one another, as is clearly shown in Fig. 6, so that they may freely pass one another as the scale oscillates. Viewed in elevation, the arms of the U-shaped supports 172 and 174 are cut away to form aligned arcuate seats indicated at 176 in Fig. 2. The center or lowermost point of the arcuate seats is, of course, midway between the scale pans and is vertically above the knife-edge bearing of the scale beam. The tolerance weight W is preferably made in the form of a slender cylindrical rod. This rod is simply laid on supports 172 and 174. Whenever the error in package weight or the unbalancing force applied to the scale is less than the tolerance weight, the scale remains in equilibrium and is held in that condition by the tolerance weight. This is so because the slightest attempted downward movement of the heavier loaded scale pan causes one of the supports 172, 174 to descend, thereupon immediately loading the other scale pan with the tolerance weight. When, however, the unbalancing force exceeds the tolerance weight, the scale continues to tip.

In Figs. 2 and 6, the housing of the scale mechanism is shown open above the tolerance weight. A closure is provided, however, as is illustrated in Fig. 4, the closure being numbered 178 and being removable by means of a suitable knob 180. Access to the tolerance weight is thus readily obtained whenever it is desired to change the tolerance or permissible error in package weight.

Scale contact or tester

As so far described, it will be seen that the scale assumes either a horizontal position for packages within the tolerance limit, or a tilted position for packages outside the tolerance limit. It is next necessary for the machine to discriminate between these two positions, that is, to determine whether the scale has remained in equilibrium, in which case the package may be delivered; or has tipped, in which case the package should be rejected. To determine the position of the scale, I provide electrical means, but the force needed to operate the same is derived from the machine; is wholly independent of the unbalancing force tilting the scale; and is so applied as not to affect the operation and accuracy of the scale. Referring to Figs. 2 and 4, I provide yieldable electrical contacts 182 and 184 mounted on a suitable insulation block 186 pivotally carried at 188 between depending support arms 190. An arm 192, extending from block 186, is connected to the driving mechanism in the base of the machine by a rod 194. It will be seen that upon vertical reciprocation of rod 194, the contacts 182 and 184 are oscillated sidewardly. With the particular circuit arrangement here disclosed, the contacts 182 and 184 are normally closed, and the spring plate or arm for contact 184 is projected upwardly beyond the upper end of contact 182.

Each scale pan extension 170 carries a loosely pivoted depending insulation block or abutment 196. The blocks 196 are equal in length and disposed adjacent one another, as is clearly shown in Fig. 2. The dimensioning of the parts is such that when the scale is in equilibrium, as shown in Fig. 2, the contact 184 comes beneath the lower ends of the blocks and therefore may be oscillated sidewardly beneath the blocks without touching the same. When, however, the scale is tipped, one or the other of blocks 196 is lowered into the path of movement of contact 184. The contact is wide enough to strike either block, thereby opening the circuit which is normally closed by the contacts 182 and 184.

It will be noted that the force needed to open the contacts is directed sidewardly of the scale, and therefore has no effect on the scale balance. However, I prefer to go even further, and I dispose a suitable stop screw 198 (Fig. 4) in back of, that is, on the opposite side of each block 196, and at the same time the block is freely pivoted on the scale extension, as is indicated at 200. Screws 198 are so adjusted that the blocks 196 just clear the same during operation of the scale, and there is accordingly no friction or resistance to movement introduced by the mechanism shown. When the scale is tilted and contact 184 bears against one of the blocks 196, the force of movement is passed sidewardly through the block to the corresponding stop screw 198.

Figure 8:
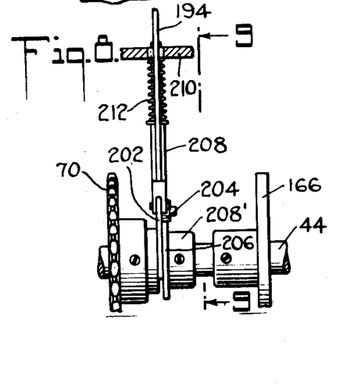
Fig. 8 shows the mechanism for moving the scale contact switch.
Figure 9:
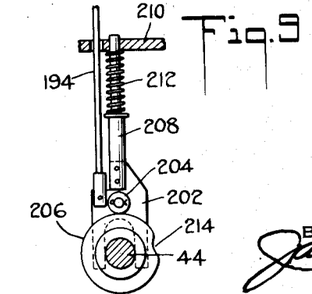
Fig. 9 is a section taken in the plane of the line 9—9 of Fig. 8.

The rod 194, which moves the contacts at the end of each weighing operation, is operated by mechanism best shown in Figs. 7, 8, and 9. Referring to Figs. 8 and 9, the lower end of rod 194 is conected to a plate 202 the bottom of which is slotted or bifurcated to straddle the timing shaft 44. Plate 202 carries a cam follower 204 which rides upon a cam 206 the collar 208' of which is secured to shaft 44. To better control the movement of plate 202, it is rigidly secured to the lower end of a relatively heavy guide rod 208 the upper end of which is reciprocably received in the top plate 210 of the machine frame. A compression spring 212 normally urges the guide rod 208 downwardly, and this keeps the cam follower roller 204 in tight engagement with the surface of the cam. The outline of the cam is generally circular but is depressed or recessed at one point, as is indicated at 214. Rod 194 is therefore normally elevated, and contacts 182, 184 normally remain out of the way of the scale parts, as is indicated in Fig. 4. At the end of each weighing operation, that is, between the points 172 and 174 in Fig. 13, the cam depression 214 reaches roller 204, and rod 194 is momentarily lowered, thereby moving the contacts sidewardly beneath or against the blocks 196, thus determining whether the scale has been tilted. The cam 206 and related parts for the right-hand scale are clearly shown in Fig. 7. The corresponding parts for the left-hand scale are omitted in Fig. 7 in order to simplify the drawings. However, the relationship of the parts will be clear from inspection of Fig. 8 which is applicable to the left-hand scale.

Figure 15:
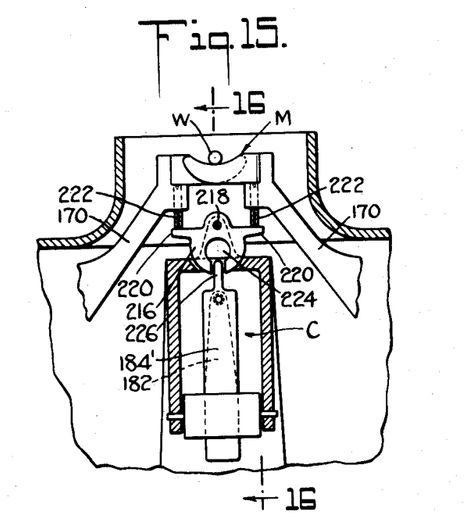
Fig. 15 is a section near the center of the scale, showing a modified form of scale switch mechanism.
Figure 16:
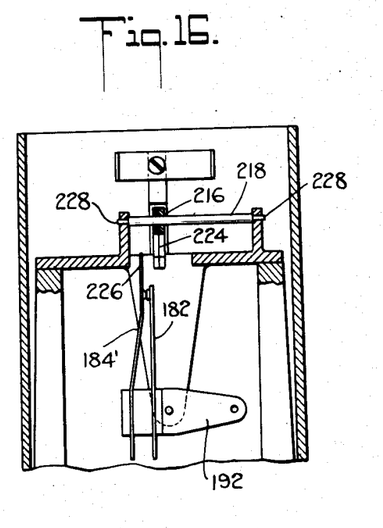
Fig. 16 is a transverse section taken in the plane of the line 16—16 of Fig. 15.

A modified form of scale contact mechanism is illustrated in Figs. 15 and 16. In this case a single oscillatable abutment 216 is used instead of the separate blocks previously described. Abutment 216 is oscillatable on a pin 218 and has outwardly projecting arms 220 adapted to be moved by screws 222 projecting downwardly from the scale pan extensions 170. It will be clear that with the scale in equilibrium the abutment 216 remains in the position shown, whereas when the scale oscillates, the abutment 216 is correspondingly oscillated. Abutment 216 has a passageway 224 cut therethrough in the path of an upwardly projecting finger 226 on the end of the outer of the two contact plates 184'. It will be understood from inspection of Figs. 15 and 16 that when the contacts are oscillated toward the abutment, the contacts remain closed if the scale is in equilibrium, whereas if the scale is unbalanced, the finger 226 bears against the abutment on either side of the slot or passage 224, whereupon the contacts are opened. The force of the opening movement of the contacts is applied to and taken by the bearings 228 of pin 218, and it will be noted in Fig. 16 that these bearings are preferably made relatively small and frictionless and are so spaced apart as to readily take the spring force of the contact 184'.

*Package discharge mechanism*

It will be recollected by reference to Fig. 1, that packages of satisfactory weight are discharged from the scale platform 18 to a suitable table 230 by a discharge or kick-off arm K which is moved from a position behind the package, shown in solid lines, to a position over table 230 shown in broken lines at K'. The accepted packages are thus formed in two parallel lines on table 230, these lines being numbered 232. The mechanism for operating the discharge arm is best shown in Figs. 7, 10, 11, and 12.

Referring to these figures, it will be seen that the discharge arm comprises a suitable bent rod 234 the upper or horizontal end 236 of which is positioned to move over the scale pan, and the lower end of which is fixedly secured within an oscillatable member 238 the collar of which is received around a stationary support rod 240. Rod 240 extends parallel to timing shaft 44, and the discharge arms are merely supported by and oscillate freely on the rod 240. Oscillatable member 238 is enlarged at 242 (Figs. 10 and 11) to receive the upper end 244 of a cam follower arm, the parts being pinned together at 246. The operating cam 248 is best shown in Fig. 11 and is mounted on timing shaft 44. The lower end of cam follower arm 244 is bifurcated and surrounds shaft 44, as is indicated at 250. Cam 248 is followed by a suitable roller 252 which is itself carried, though only indirectly, by arm 244. More specifically, cam roller 252 is carried on a plate 254 lying at one side of arm 244, (Fig. 12). Plate 254 also carries a pin 256 which projects through a slot 258 in arm 244.

Arm 244 carries a latch plate 260 pivoted at 262. The lower end of latch plate 260 is recessed to fit over pin 256, as is clearly shown in Fig. 11. The latch plate 260 is normally held in the position shown, by a tension spring 264. It will be obvious that with this arrangement as so far described, the movement of the cam follower roller is transferred through pin 256 and latch plate 260 to arm 244 and thence to the package discharge arm. However, if latch plate 260 is oscillated in a counter-clockwise direction, as viewed in Fig. 11, the pin 256 simply idles in slot 258 without oscillating the package discharge arm. It may be noted at this point that the package discharge arm 236 is normally retained in retracted position behind the scale, by a pull spring 266, best shown in Fig. 10, and this spring is more powerful than the latch spring 264.

To control the position of latch 260, I provide a member 268 which is shown moved upwardly out of position in Fig. 11, in order to clarify the parts disposed therebeneath. The collar 270 of member 268 is received freely on timing shaft 44, as is best shown in Fig. 12. The upper end is provided with a generally triangular-shaped aperture 272. This is received over a pin 274 which projects sidewardly from latch plate 260. The aperture is so large that the regular reciprocation of the latch plate with the cam follower is in no way obstructed. If member 268 is oscillated clockwise about shaft 44, the pin 274 and with it the latch plate 260 are oscillated counter-clockwise, thus making the package discharge arm inoperative. Arm 268 is moved clockwise by means of a rod 276 (see Fig. 10) secured to a bearing hole 278 (Fig. 11) in the end of member 268. Referring to Fig. 10, the rod 276 extends downwardly to a suitable solenoid 280 secured to the machine frame, the solenoid being thereby adapted to make the package discharge arm inoperative. Solenoid 280 is, of course, suitably electrically interconnected with the scale contact mechanism previously described, so that whenever the scale is unbalanced, the solenoid is energized, thereby leaving the faulty package on the scale.

It will be understood that the faulty package is discarded without the use of further mechanism, by the simple step of causing the next package fed to the scale by distributor arm 20, to push the faulty package sidewardly from the scale pan to the downwardly sloping tracks or reject chutes R previously referred to and best shown in Figs. 1 and 7. The upper end of the reject chute is so curved and dimensioned, as is shown in Fig. 7, that the package moves beyond dead-center while still being pushed by the next package supplied to the scale, whereupon the faulty package tilts and slides down the chute without further assistance.

The electrical circuits

Figure 14:
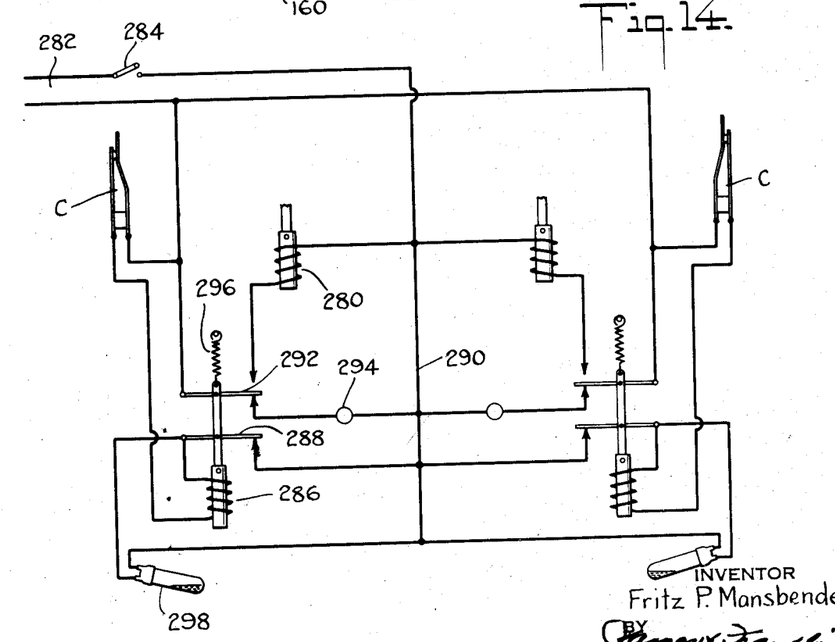
Fig. 14 is a schematic wiring diagram of the electrical control equipment in the machine.

The scale contact and the solenoids may be interconnected by a variety of circuits, but I prefer a circuit schematically illustrated in Fig. 14 which, while not the simplest possible circuit for this purpose, possesses some important advantages. Referring to Fig. 14, a suitable source of current, preferably ordinary power-line or household wiring, is connected to the machine through conductors 282. The power may be turned on or off by a master switch or power switch 284 mounted on the machine. Energy from the power-line flows through contacts C and thence through the coil 286 of a suitable relay, and thence through one contact arm 288 of the relay to conductor 290 leading back to the other side of the power-line. The relay has another contact arm 292 which supplies current from the power-line through a pilot light 294 the continued illumination of which shows that the machine is in operation and that the packages are of correct weight. The solenoid for making the package discharge arm inoperative is indicated at 280, and it will be noted that the circuit through solenoid 280 is normally open. The relay 286 is in effect a stick relay by reason of the contact 288 which causes relay coil 286 to remain energized when once the relay has been closed.

When a package is of incorrect weight, the contacts C are opened whereupon relay coil 286 is deenergized and contact levers 288 and 292 are elevated by spring 296. Contact arm 292 on moving upwardly supplies current directly from the power-line to solenoid 280, thereby making the discharge arm inoperative. At the same time, the pilot light 294 blinks, that is, it is temporarily extinguished.

To complete the operating cycle, it is only necessary to restore relay 286 to its initial position. This I do by means of an auxiliary switch, preferably of the mercury type, as is indicated at 298. Swith 298 is normally open but at the end of each operating cycle of the machine is tilted upwardly, thus transferring the mercury to the electrodes and supplying current through the relay coil 286. When the relay coil is energized, it remains energized through contact arm 288, and switch 298 need therefore be energized only momentarily.

Switch 298 is oscillated by mechanical means best shown in Fig. 7 of the drawings. Referring to that figure, it will be seen that switch 298 is mounted on a support plate 300 oscillatable about a pivot 302. Plate 300 is connected by means of a link 304 to a pin 306 at the lowermost end of arm 30 which carries the package distributor 20. Link 304 is longitudinally slotted (305) for a substantial distance, thus providing ample clearance for oscillation of arm 30 without causing longitudinal movement of link 304. However, at the end of the oscillation of arm 30, when all of the lost motion has been used up, the link 304 functions to oscillate plate 300 about pivot 302. The plate is restored by reason of a tension spring 308 connected between link 304 and the wall of the machine frame.

It will be noted, both in Fig. 1 and in Fig. 14, that the arrangement is entirely symmetrical with respect to both sides of the machine, and the description so far given of one side should suffice for the other. The two sides of the machine function in alternation, and in the position shown in Fig. 7 the right-hand mercury switch has just been closed, while the left-hand mercury switch is open.

Operation

In operation, packages are fed along track T by the packaging machine. The endmost package is transferred sidewardly on plate 16 to one of the scales by distributor arm 20, whereupon the arm is retracted to intermediate position. The scale pan supports are lowered, and if the package being tested is within the tolerance limits, the scale remains in equilibrium. The scale contacts are moved toward the abutment blocks of the scale but pass freely beneath the same and the contacts are not opened. The package discharge arm is then moved forwardly from behind the package, and discharges the accepted package from the scale, whereupon the scale is ready to receive the next package to be tested. In the meantime a package has been transferred to and is being tested by the scale on the opposite side of the machine.

If the package does not come within the tolerance limits, the scale tips as the scale supports are lowered, and the heavier loaded scale pan rests upon and follows its scale support all the way to the lower limit of movement. Thereafter the scale contact is moved toward the abutment blocks and is thereby opened. This causes the relay to function, which in turn supplies current directly from the power-line to the solenoid. The solenoid releases the latch plate in the cam operated mechanism of the discharge arm, thus leaving the discharge arm in retracted position. The package remains on the scale and is dislodged sidewardly onto a discard chute by the next package supplied to the scale. In the meantime the relay is reset by the mercury switch. Of course, before a package is discharged from the scale and another supplied thereto, the scale is locked against movement and the knife-edge bearings thereof are relieved of all load.

As so far described, I have assumed that the tolerance is to be expressed with respect to a mean or average figure which is the desired package weight. In other words, the tolerance is plus or minus some definite and specific value. However, in some cases, particularly when dealing with packages of food, it may be desired to establish a minimum weight and to reject all packages which come at all below the minimum weight, that is, the tolerance may be plus a specific amount and minus nothing, this being so because overweights are permissible, though not wanted, whereas under-weights are not permissible. It should be noted that the tolerance of plus a definite value, say A ounces, minus nothing, may also be expressed in such a way as to give equal and specific values on either side of a new or modified mean value or standard value, the total tolerance from minimum to maximum being A ounces, and any weight within this tolerance range will be acceptable. In effect, what is done is to raise the value of the mean or standard weight by $$\frac{A}{2}$$

ounces and thereupon specifying the tolerance to be plus or minus $$\frac{A}{2}$$

ounces with reference to the new standard. Thus, the scale pan carrying the standard weight may be an actual standard or a somewhat modified standard, depending upon the conditions imposed upon the machine. In general, all measurement to be performed by a machine of this character will fall into any one of three tolerances, that is, plus or minus $$\frac{A}{2}$$

plus A minus zero; and plus zero minus A; and all of these may be expressed as plus or minus $$\frac{A}{2}$$

by suitably modifying the standard weight placed upon the scale pan.

The machine may be used directly coupled to a packaging machine because the cycle of operation is fixed. A part of the available time is consumed in placing the package on as well as the removal of the package from the scale. When weighing with a sensitive scale there are several factors which have to be considered, these being (1) the mass of the structure and the weights to be moved; (2) the minimum weight or force available to accelerate this mass; and (3) the time required for the mass to move a specific distance. Obviously the mass is to be kept as small as possible, while the minimum weight should be small if the scale is to be sensitive; and it is for this reason that jewel bearings and similar structural refinements are employed. The third factor depends upon the amount of unbalance beyond tolerance and also upon the physical displacement of the scale needed to permit detection of the scale condition. In addition to these three factors, there is the matter of energy to be considered, for as soon as the scale passes from the static into the dynamic state, the mass involved acquires velocity and therefore momentum which becomes very troublesome if it is not absorbed or converted. The use of a dash-pot is highly objectionable as it slows down the motion of the beam and pans, which as a rule is already slow considering the limited time available for weighing. For this reason, my arrangement allows the scale to operate unobstructedly to the very end of the available weighing time, at which time the scale contact or tester is moved to determine the position of the scale. It need only determine whether or not the scale has moved, for the amount of movement is always the same. With this system it is essential to keep the motion of the scale parts under control, that is, under no circumstances should they be allowed to fall or move unrestrained under the action of an unbalancing force or overweight no matter how large. Ordinarily, the speed of the parts being moved would depend upon the amount of unbalance beyond tolerance. Moreover, the rate of movement is not uniform but is uniformly accelerated. I preferably permit the scale movement to accelerate, but I limit the actual speed, or amount of acceleration to an amount which is maintained the same regardless of how far the scale unbalance exceeds the tolerance, for in this manner the timing of the movements is predetermined and kept uniform. For this purpose the scale pan supports are moved downwardly by a cam at a speed equal to that which the scale pan would assume if moving under the influence of the smallest practical excess or unbalance over tolerance. This practical minimum is related, of course, to the speed of operation of the machine. At lower speeds a smaller force is practical, while at higher speeds a larger force is needed, for a particular machine with specific bearings (steel or agate, etc.) and specific range of scale pan movement. Knowing the speed requirement, this matter is readily taken care of. The particular machine illustrated handling 40 packages per minute, was designed for a practical minimum of 1/120 ounce. In all practical cases a descending scale pan rests upon and moves with the scale support. With this arrangement it is a simple matter to cause all of the operations of the machine to follow a definite time sequence and to synchronize the machine with the packaging machine which drives the same.

Moreover, the scale supports act as locking means to lock the scale and to protect the knife-edge bearings, for the scale is locked at all times except during the actual weighing operation. The scale supports also function to reset the scale to equilibrium position for each weighing operation. The machine is particularly advantageous in being substantially unaffected by vibration or teetering.

Regarding the tolerance determining mechanism, it may be explained that in effect the two scale pans are loaded between them with a single tolerance weight. With a true scale balance, each pan will be loaded by exactly one-half the tolerance weight. If an overweight exists on one pan, that pan's share of the tolerance loading decreases, while the share of the tolerance loading of the other pan correspondingly increases. When the difference in weight just equals the tolerance weight, the scale is still statically balanced, the full tolerance weight being assumed by the pan with the lighter load. Any further discrepancy in loading, however, exceeds the tolerance, and the scale can no longer remain in static equilibrium but instead moves along with the scale supports.

It will be apparent that while I have shown and described my invention in a preferred form, many changes and modifications may be made in the structure disclosed, without departing from the spirit of the invention, defined in the following claims.

I claim:

1. A power driven weight testing machine comprising a scale, means to feed packages thereto and to discharge the same therefrom in timed sequence, a support to support the scale against tipping, and means to automatically move the support in the direction of tipping to permit tipping during the weighing operation, said means being moved more slowly than the natural rate of tipping of the scale when the unbalancing force is a practical minimum, whereby the rate of tipping of the scale is predetermined and made to be the same regardless of any greater amount of unbalance of the scale.

2. A power driven weight testing machine comprising a scale having a scale pan, a support to support the scale pan during the feed of a package thereto, and mechanically operated means to automatically lower the support during the weighing operation, said means being moved more slowly than the natural rate of descent of the scale pan when the unbalanced force is a practical minimum, whereby the descent of the scale pan is predetermined and made to be the same regardless of any greater amount of unbalance of the scale.

3. A weight testing machine comprising a scale, a support to support the scale against tipping, means to lower the support during the weighing operation, said means being moved more slowly than the natural rate of tipping of the scale when the unbalancing force is a practical minimum, whereby the rate of tipping of the scale is predetermined and made to be the same regardless of any greater amount of unbalance of the scale, and electrical contact means operative solely at the end of the weighing operation to determine whether the scale has been tipped.

4. A weight testing machine comprising a scale beam with scale pans, supports for the scale pans to normally lock the scale in balanced position, means to feed a package to be weighed to or from one of the scale pans while the scale is locked in balanced position, means to move the supports downwardly during the weighing operation, said means being moved at a rate no faster than the natural rate of descent of the heavier loaded scale pan when the unbalancing force is a practical minimum, and electrical contact means to determine whether the scale has been tipped, said means being operative solely at the end of the weighing operation.

5. A weight testing machine comprising a scale beam with scale pans, means including a tolerance determining means to prevent tipping of the scale beam by an unbalance less than the tolerance, supports for the scale pans to normally lock the scale in balanced position, means to feed a package to be weighed to one of the scale pans while the scale is locked in balanced position, and means to move the supports downwardly during the weighing operation, said means being moved at a rate no faster than the natural rate of descent of the heavier loaded scale pan when the unbalancing force in excess of the tolerance is a practical minimum.

6. A weight testing machine comprising a scale beam with scale pans, supports for the scale pans to normally lock the scale in balanced position, means to feed a package to be weighed to one of the scale pans while the scale is locked in balanced position, means to move the supports downwardly during the weighing operation, said means being moved at a rate no faster than the natural rate of descent of the heavier loaded scale pan when the unbalancing force is a practical minimum, electrical contact means to determine whether the scale has been tipped, and means for causing relative movement of the contact means, said means being operated solely at the end of the weighing operation and producing an operating force which is independent of the force unbalancing the scale and which is so directed as not to affect the position of the scale.

7. A weight testing machine comprising a scale having a scale beam and scale pans, extensions from each of the scale pans toward the other, and a tolerance determining device bearing against both extensions when the scale is in equilibrium, but bearing against one extension when the scale is tipped, whereby said scale is not tipped unless unbalanced by a weight in excess of the force exerted against the extensions by the tolerance determining device.

8. A weight testing machine comprising a scale having a scale beam and scale pans, extensions from each of the scale pans toward the other, a support on each extension, said supports overlapping when viewed in elevation, and clearing one another when viewed in plan, and a tolerance weight lying across both supports and adapted to be supported by either support, whereby said scale is not tipped unless unbalanced by a mass in excess of the tolerance weight.

9. A weight testing machine comprising a scale having a scale beam and scale pans, extensions from each of the scale pans toward the other, a forked support on each extension, said supports being intermeshed in non-interfering relation, and a tolerance weight in the form of an elongated rod lying across the forked supports, whereby said scale is not tipped unless unbalanced by a mass in excess of the tolerance weight.

10. A weight testing machine comprising a scale, a stop, a movable contact switch, means to bodily move the contact switch toward the stop at the end of each weighing operation, an abutment pivotally suspended from the scale and movable into or out of the path of the contact switch between the stop and the switch, and means connecting the scale to the abutment, whereby movement of the scale causes movement of the abutment, the parts being so related that the contact switch clears the abutment when the scale is in one position, but bears against the abutment and through it against the stop when the scale is in another position, and said switch being so constructed as to have its condition changed on bearing against the abutment.

11. A weight testing machine comprising a scale including a scale beam and scale pans, a stationary stop, a contact switch, an abutment freely pivotally suspended from the scale, means to bodily move the contact switch sidewardly of the scale toward the abutment and the stop at the end of each weighing operation, and means connecting a scale pan to the abutment, whereby movement of the scale pan causes movement of the abutment, the parts being so related that the contact switch clears the abutment when the scale is in equilibrium, but bears against the abutment and through it against the stop when the scale is unbalanced, and said switch being so constructed as to have its condition changed on bearing against the abutment.

12. A weight testing machine comprising a scale including a scale beam and scale pans, extensions projecting from each of the scale pans toward one another, a block on each of the extensions, electrical contact mechanism having a part disposed on one side of said blocks, and means to move the contact mechanism toward the blocks at the end of each weighing operation, the parts being so disposed that the contact mechanism clears the blocks when the scale is in equilibrium but bears against one or the other of the blocks when the scale is tipped.

13. A weight testing machine comprising a scale including a scale beam and scale pans, extensions projecting from each of the scale pans toward one another, a block depending from and freely pivoted on each of the extensions, stops on one side of the blocks, electrical contact mechanism having a part disposed on the opposite side of said blocks, and means to move the contact mechanism toward the blocks at the end of each weighing operation, the parts being so disposed that the contact mechanism clears the blocks when the scale is in equilibrium but bears against one or the other of the blocks when the scale is tipped, the force of engagement between the contact mechanism and the blocks being taken by the aforesaid stops on the opposite side of the blocks.

14. A weight testing machine comprising a support, a scale including a scale beam and scale pans, appropriate knife-edge bearings therefor, means to feed packages to a scale pan and to discharge the same therefrom in timed sequence, a vertically movable scale support, said support having an elevated position so selected as to just relieve the knife-edge bearings, and means operated by the driving mechanism of the weight testing machine in synchronism with the weighing operation for lowering the scale support.

15. A weight testing machine comprising a standard, a scale including a scale beam and scale pans, appropriate knife-edge bearings between the scale pans and the scale beam, means to feed packages to a scale pan and to discharge the same therefrom in timed sequence, vertically movable scale pan supports at each end of the scale beneath the scale pans, said supports having an elevated position so selected as to just relieve the scale pans from the knife-edge bearings, and means operated by the driving mechanism of the weight testing machine in synchronism with the weighing operation for simultaneously lowering the scale pan supports at both ends of the scale.

16. A weight testing machine comprising a support, a scale including a scale beam and scale pans, appropriate knife-edge bearings between the scale beam and the stationary support and between the scale pans and the scale beam, means to feed packages to a scale pan and to discharge the same therefrom in timed sequence, vertically movable scale pan supports at each end of the scale, resilient means normallly holding said supports in elevated position, said elevated position being so selected as to just relieve the scale pans from the knife-edge bearings, means operated by the driving mechanism of the weight testing machine in synchronism with the weighing operation for simultaneously lowering the scale pan supports at both ends of the scale in opposition to the aforesaid resilient means, and additional means for especially elevating and mechanically locking said scale pan supports in a more elevated position in order to relieve the scale beam as well as the scale pans from all of the knife-edge bearings.

17. A weight testing machine comprising a driving shaft, a scale, means driven by the shaft for feeding a package to be tested to the scale, mechanism driven by the shaft to discharge an acceptable package from the scale to a discharge track, electrically operated means for making said mechanism inoperative, whereby the package remains on the scale, an electrical detector device mechanically moved by said shaft during each weighing cycle and so related to the scale as to detect whether the scale is unbalanced, said detector device controlling the aforesaid electrically operated means whereby an unacceptable package is not discharged to the discharge track.

18. A weight testing machine comprising a driving shaft, a scale, means driven by the shaft for feeding a package to be tested to the scale, means to discharge an acceptable package from the scale to a discharge track, cam and cam follower mechanism driven by said shaft for operating said means, a solenoid for making said mechanism inoperative whereby the package remains on the scale, an electrical contact device mechanically moved by said shaft during each weighing cycle and so related to the scale as to determine whether the scale is in equilibrium or is unbalanced, said contact device controlling the energization of said solenoid, whereby an unacceptable package is not discharged to the discharge track.

19. A weight testing machine comprising a driving shaft, a scale, means driven by the shaft for feeding a package to be tested to the scale, means to discharge an acceptable package from the scale to a discharge track, cam and cam follower mechanism driven by said shaft for operating said means, a solenoid for making said mechanism inoperative, a stick relay for controlling the energization of said solenoid, an electrical contact device mechanically moved by said shaft during each weighing cycle and so related to the scale as to determine whether the scale is in equilibrium or is unbalanced, said contact device controlling the energization of said relay, a mercury switch connected in said relay circuit, and means mechanically operated by said shaft during each weighing cycle for tipping the mercury switch, the parts being so arranged in circuit that the mercury switch serves to reset the stick relay whenever the stick relay has been opened.

FRITZ P. MANSBENDEL.